July 1, 1958
E. W. JACOBSON
2,841,167
BALL TYPE SHUT-OFF VALVE
Filed July 27, 1953
2 Sheets-Sheet 1
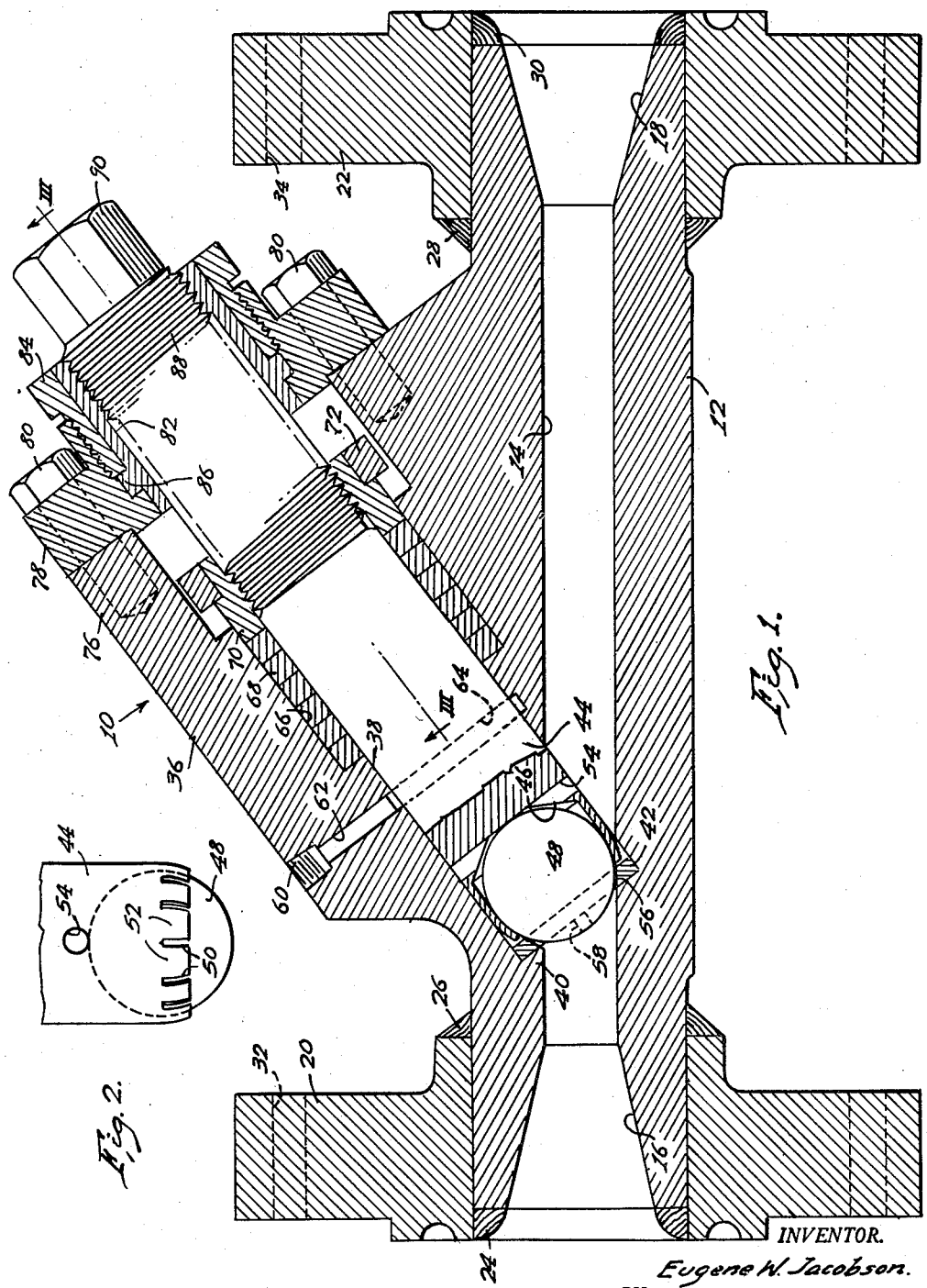
INVENTOR.
Eugene W. Jacobson.
BY
Horace Cooke
ATTORNEYS July 1, 1958  E. W. JACOBSON  2,841,167
BALL TYPE SHUT-OFF VALVE
Filed July 27, 1953  2 Sheets-Sheet 2

INVENTOR.
Eugene W. Jacobson.
ATTORNEY:-

United States Patent Office 2,841,167
Patented July 1, 1958

2,841,167
BALL TYPE SHUT-OFF VALVE

Eugene W. Jacobson, Oakmont, Pa., assignor to Gulf Research & Development Company, Pittsburgh, Pa., a corporation of Delaware Application July 27, 1953, Serial No. 370,436

2 Claims. (Cl. 137—327)

This invention relates to ball type shut-off valves, and pertains more particularly to such a valve having a straight fluid passageway therethrough that is substantially unobstructed when the valve is open.

There is a definite need in those industries wherein large quantities of fluids containing abrasive materials are transported for a shut-off valve that will resist erosion due to the turbulent flow of such fluids therethrough. Such need is particularly felt in the petroleum industry wherein large quantities of hot abrasive mixtures of petroleum products and entrained solid catalyst particles are conducted between processing units. A positive acting shut-off valve is needed to prevent leakage of hydrogen and other gaseous hydrocarbons, inasmuch as conventional plug valves, gate valves and slide valves become ineffective for positive closure due to the adverse effects on the valve produced by erosion. Furthermore, there is a definite need for a positive acting shut-off valve for handling fluids containing solid particulate matter in which the movable parts will not become "frozen" or bound by such particulate matter.

Broadly, the valve constituting the subject matter of the present invention, which satisfies the above-mentioned needs, affords a straight passageway for fluids therethrough, whereby fluid turbulence and erosion by particulate matter contained therein is minimized. The valve includes a hardened ball as the valving element and means for moving such hardened ball into the fluid passageway along a path inclined at an acute angle thereto. An annular valve seat, formed of material relatively soft and ductile as compared to the hardened ball, surrounds the passageway and is dimensionally so related thereto as not to obstruct the same. The means provided for moving the hardened ball are of such character as to permit rotation of the hardened ball and to exclude particulate matter passing through the valve from between any of the relatively movable surfaces in the valve.

The invention will be more fully appreciated upon consideration of the following detailed description thereof, in connection with the accompanying drawings, wherein:

Figure 1 is a central longitudinal sectional view of the valve with portions of the valve stem being shown in elevation;

Figure 2 is an enlarged fragmentary view of the ball and the means provided for securing the same to the valve stem, with the hidden portions of the ball being shown in dashed outline;

Figure 4:
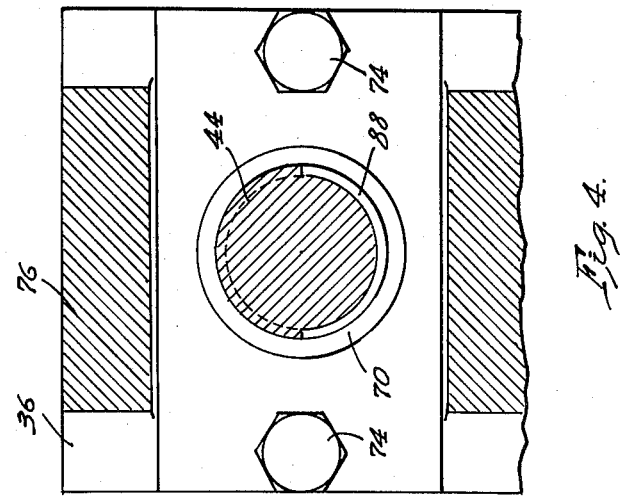

Referring to the drawings wherein similar numerals designate similar parts throughout the various views, the numeral 10 designates the valve generally.

The valve 10 comprises a valve body 12 having a longitudinally straight passageway 14 therethrough. The passageway 14 is of circular cylindrical transverse configuration throughout the major portion of the length of the valve body 12, but is outwardly flared adjacent its opposite ends as at 16 and 18 so that the passageway 14 is generally of venturi-shape. The venturi-shaped passageway 14 tends to minimize turbulence of fluids passing therethrough and, consequently, the erosion produced by abrasive materials contained by such fluids.

Annular flanges 20 and 22 embrace the opposite extremities of the valve body 12, the flange 20 being secured to the valve body 12 by welds 24 and 26, and the flange 22 being secured by welds 28 and 30. It will be noted that the welds 24 and 30 are shaped in such manner as to constitute extensions for the flaring portions of the passageway 14. Although not so shown in the drawings, the flanges 20 and 22 can be constructed integral with the valve body 12. The flanges 20 and 22 are provided with suitable openings 32 and 34, respectively, whereby the valve 10 may be secured in position in a conduit, not shown.

The valve body 12 is laterally enlarged at one side of the passageway 14, as at 36. The enlarged portion 36 of the valve body 12 is provided with a cylindrical opening 38, having an axis coplanar with and inclined at an acute angle to the passageway 14. The inner end of the opening 38 terminates at the intersection of the opening 38 with the passageway 14 and at such a position to define an annular shoulder 40 that surrounds the passageway 14. The annular shoulder 40, thus defined, constitutes a stop for an annular valve seat 42 fitted at the inner end of the opening 38 in a position surrounding the passageway 14 without obstructing the same.

In order that the shoulder 40 extends entirely around the passageway 14, and in order that the valve seat 42 resting flush thereagainst be coaxial with the opening 38, it is necessary that the diameter of the opening 38 be greater than the diameter of the passageway 14 at the intersection multiplied by the secant of the angle of intersection.

A valve stem 44 is slidably and rotatably received in the opening 38, and, as best shown in Figures 1 and 2, the inner extremity of the valve stem 44 is recessed at 46 to receive a ball 48. The ball 48 constitutes the valving element of the present invention and is removably retained in the recess 46 by means of the extremity of the valve stem 44 adjacent the passageway 14 being provided with a plurality of crosscuts 50 that define tabs 52, such tabs 52 being inturned and crimped lightly about the ball 48 in such a manner as to permit the ball 48 to rotate within the recess 46. As shown in Figures 1 and 2, the valve stem 44 is provided with a transverse opening 54 that communicates with the interior of the recess 46, such transverse opening 54 being for the purpose of receiving a drift pin, not shown, whereby the ball 48 may be driven outwardly from the recess 46.

For reasons to be subsequently set forth, the ball 48 is preferably fashioned of a hard, corrosion resistant material, such as "Inconel" or "K-Monel." The annular valve seat 42 is provided with a frusto-conical opening 56 for seating of the ball 48, and is fashioned from a relatively soft, ductile material as compared to the ball 48, such as "Armco Iron." In the preferred construction, a pair of diametrically opposed recesses 58 are milled in the shoulder 40 so as to underlie the annular valve seat 42, such recesses 58 being for the purpose of facilitating removal of the valve seat 42 in the use of the valve seat replacement tool disclosed in copending application, Serial No. 370,529, filed July 27, 1953, by Eckler and myself as coinventors.

The valve stem 44 is preferably fashioned of a corrosion resistant material, such as stainless steel, and is highly polished for a snug sliding fit within the opening 38. As will be noted, the valve stem 44 is of uniform diameter so as to prevent the possibility of particulate solids from by-passing the valve stem 44 and accumulating and packing in any open spaces, such as are found about the valve stems of conventional valves, where they might cake or solidify into a hard mass and thus cause scoring or binding of the valve stem 44 or the valve body 12. In order to insure free movement of the valve stem 44 and to relieve any sticking of the valve stem 44 that might occur, a pipe tap 60 and a drilled hole 62 are provided in the enlarged portion 36 of the valve body 12 to communicate with a groove 64 formed in the valve body 12 to encircle the valve stem 44, whereby a lubricant may be applied to the valve stem 44.

Figure 3:
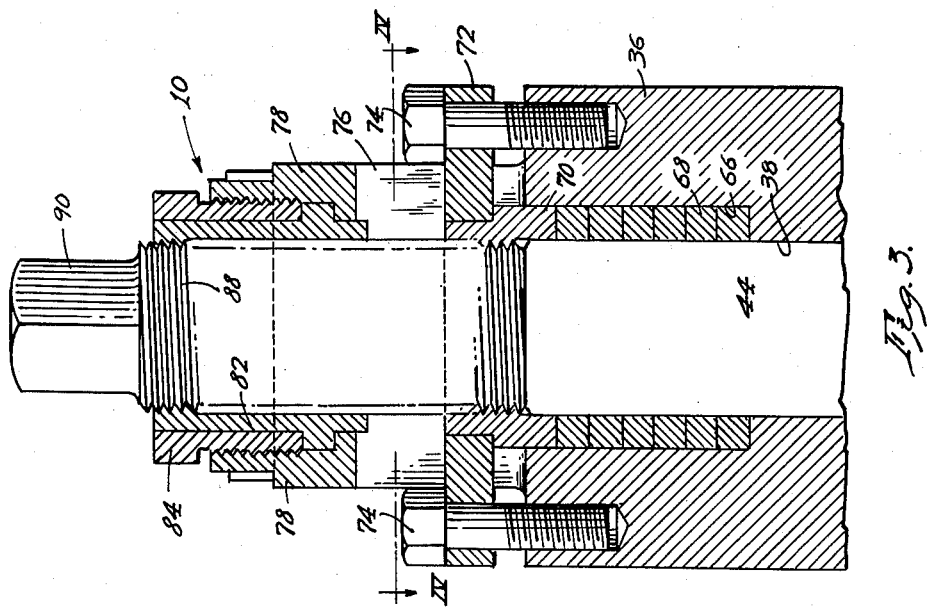
Figure 3 is a sectional detail view taken upon the plane of the section line 3—3 in Figure 1, with the valve stem being shown in elevation; and, Figure 4 is a sectional view taken upon the plan of the section line 4—4 in Figure 3.

The outer end portion of the opening 38 is enlarged, as at 66, and receives a standard type of high temperature packing 68 that is held in place by a conventional stuffing box gland 70. The stuffing gland 70 is tightened into position by a gland yoke 72 that may be tightened by cap screws 74 that extend therethrough and which are threaded into the enlarged portion 36 of the valve body 12, as clearly shown in Figure 3.

The enlarged portion 36 of the valve body 12 extends outwardly beyond the gland yoke 72 on opposite sides thereof, as at 74, and abuts an internally shouldered cross yoke 78 that is secured thereto by cap screws 80. An internally threaded bushing 82, preferably formed of hardened stainless steel to prevent galling of the threads, is positioned within the cross yoke 78 and is retained in position by a bushing nut 84 that is threaded into the cross yoke 78 to engage an annular rib 86 on the bushing 82. In order to insure axial alignment of the bushing 82 and the valve stem 44, the bushing 82 is threaded upon the valve stem 44 and the bushing 82 then secured in position by tightening the bushing nut 84. A portion of the axial extent of the valve stem 44 is threaded, as at 88, and is in threaded engagement with the bushing 82. The valve stem 44 has a hexagonal head 90 machined on the outer extremity thereof, so that a standard wrench may be used for turning the same.

In operation, the valve 10 may be opened and closed simply by rotating the valve stem 44, whereby the ball 48 may be advanced into sealing engagement with the valve seat 42 as shown in Figure 1, or retracted to a position at one side of the passageway 14. In such retracted position, the ball 48 and the valve stem 44 are subjected to a minimum of erosive action. The valve seat 42 is positioned substantially clear of the passageway 14 so as to be subjected to a minimum of erosive action, and in this connection, if desired, can be positioned axially along the length of the passageway 14 so as to be adjacent the vena contracta of fluids flowing therethrough. The frusto-conical opening 56 through the valve seat 42 affords a line of contact seal with the ball 48, so that a gas-tight seal therebetween may be effected. Furthermore, inasmuch as the valve seat 42 is formed of a material relatively soft and ductile as compared to the ball valve 48, any particulate solids disposed thereon may be embedded in the valve seat 42 and a gas-tight seal obtained by simply tightening the valve stem 44. The hardness of the ball 48, coupled with the fact that the ball 48 is rotatably received in the recess 46 in the valve stem 44, minimizes any abrading effect upon the ball 48 when the valve stem 44 is tightened. In addition, the rotatable mounting of the ball permits the ball 48 to present new surfaces for engagement with the valve seat 42.

As mentioned previously, the valve seat 42 does not obstruct the passageway 14 and is disposed substantially out of the linear path of materials passing through passageway 14. In order that this structural desideratum may be obtained, the axis of the opening 38 is preferably inclined to the axis of the passageway 14 at an angle of about 35° to about 40°. However, acute angles larger and smaller than these values can also be used. Depending upon the inclination of the axis of the opening 38 to the axis of the passageway 14, the diameter of the opening 38 and the internal dimensions of the valve seat 42 should be so chosen that the valve seat 42 is substantially clear of the path of material passing through the passageway 14. With the opening 38 and the passageway 14 being circular in cross section, as shown, the diameter of the opening 38 must be greater than the diameter of the passageway 14 multiplied by the secant of the angle of intersection.

In the event that it is desired that the passageway 14 have a cross section other than circular, say elliptical, it is essential to the practice of this invention that the transverse dimensions of the opening 38, irrespective of whether such opening is circular in cross section, be sufficiently great that a shoulder 40 is defined at the intersection that entirely surrounds the passageway 14. Should the opening 38 have an elliptical cross section, so that the shoulder 40 would be of uniform width entirely around a circular passageway 14, appropriate changes in the transverse configuration of the valving means and the valve-actuating means can be made.

The subject invention is susceptible to simplification, such as direct utilization of the shoulder 40 as a valve seat, in which event the valve stem 44 (less ball 48 and appropriately shaped at the end) could be used as the valving element.

The invention is susceptible to numerous variations, such as indicated above, from the preferred form described and shown in the drawings without departing from the spirit thereof. Accordingly, the actual scope of the invention should be ascertained by reference to the appended claims.

I claim:

1. In a valve construction, a valve body having a straight passageway therethrough of circular cross section, said valve body also having a cylindrical opening therein of circular cross section that is inclined at an acute angle to said passageway, said opening intersecting an intermediate portion of said passageway and terminating at such intersection, with the diameter of said opening being greater than the diameter of the passageway multiplied by the secant of said acute angle to define an annular shoulder in the valve body that surrounds the passageway, an annular valve seat fitted in said opening and engaging said shoulder, said shoulder having a recess therein underlying the valve seat whereby the latter can be forcibly removed, said valve seat having a substantially frusto-conical opening therethrough of such a diameter and slope that the valve seat is substantially clear of the passageway, a cylindrical valve stem slidingly and sealingly received in the cylindrical opening, the end of the valve stem adjacent the valve seat having a recess therein, a ball rotatably received in the recess, the end portion of the valve stem surrounding the recess having a plurality of cross cuts therein to define inturned tabs that retain the ball within the recess, said valve stem having a transverse opening therein that communicates with the innermost portion of the recess, such transverse opening being in alignment with a portion of the ball for facilitating removal of the ball from the recess, said ball being engageable with the valve seat to close the passageway, and screw means for causing longitudinal movement of the valve stem.

2. In a valve construction, a valve body having a straight passageway therethrough of circular cross section, said valve body also having a cylindrical opening therein of circular cross section that is inclined at an acute angle to said passageway, said opening intersecting an intermediate portion of said passageway and terminating at such intersection, with the diameter of said opening being greater than the diameter of the passageway multiplied by the secant of said acute angle to define an annular shoulder in the valve body that surrounds the passageway, an annular valve seat fitted in said opening and engaging said shoulder, said shoulder having a recess therein underlying the valve seat whereby the latter can be forcibly removed, said valve seat having a substantially frusto-conical opening therethrough of such a diameter and slope that the valve seat is substantially clear of the passageway, a cylindrical valve stem slidingly and sealingly received in the cylindrical opening, the end of the valve stem adjacent the valve seat having a recess therein, a ball rotatably received in the recess, the end portion of the valve stem surrounding the recess having a plurality of crosscuts therein to define inturned tabs that retain the ball within the recess, said valve stem having a transverse opening therein that communicates with the innermost portion of the recess, such transverse opening being in alignment with a portion of the ball for facilitating removal of the ball from the recess, said ball being engageable with the valve seat to close the passageway, screw means for causing longitudinal movement of the valve stem, packing means intermediate the screw means and the passageway constituting a portion of the valve body defining the cylindrical opening, and means for introducing a lubricant into the cylindrical opening intermediate the packing means and the passageway.

References Cited in the file of this patent

UNITED STATES PATENTS

| | | |
|---|---|---|
| 682,838 | Baker et al. | Sept. 17, 1901 |
| 994,268 | Milne et al. | June 6, 1911 |
| 1,115,256 | Torbet | Oct. 27, 1914 |
| 1,182,166 | Graham | May 9, 1916 |
| 1,461,439 | Burgin | July 10, 1923 |
| 1,693,676 | Spinelle | Dec. 4, 1928 |
| 1,721,204 | Burstall | July 16, 1929 |
| 1,822,682 | Weiger | Sept. 8, 1931 |
| 2,643,679 | Keamerer | June 30, 1953 |

FOREIGN PATENTS

| | | |
|---|---|---|
| 8,691 | Great Britain | May 2, 1894 |
| 580,427 | Germany | Aug. 2, 1933 |
| 459,662 | Great Britain | Jan. 11, 1937 |